(12) United States Patent
Frisch

(10) Patent No.: US 6,848,924 B2
(45) Date of Patent: Feb. 1, 2005

(54) CONNECTOR PIECE FOR FLEXIBLE PLASTIC CONDUITS, COMPRISING A SENSOR ASSEMBLY

(75) Inventor: Herbert Frisch, Göppingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/399,599

(22) PCT Filed: Oct. 12, 2001

(86) PCT No.: PCT/EP01/11804

§ 371 (c)(1),
(2), (4) Date: Apr. 17, 2003

(87) PCT Pub. No.: WO02/37013

PCT Pub. Date: May 10, 2002

(65) Prior Publication Data

US 2004/0023550 A1 Feb. 5, 2004

(30) Foreign Application Priority Data

Oct. 31, 2000 (DE) ......................... 100 54 560

(51) Int. Cl.$^7$ ............................................... H01R 4/64
(52) U.S. Cl. ..................... 439/191; 439/913; 439/427
(58) Field of Search ............................ 439/190–199, 439/427, 426, 913

(56) References Cited

U.S. PATENT DOCUMENTS

| 3,471,826 | A | * | 10/1969 | Hutter et al. | ............... 439/198 |
|---|---|---|---|---|---|
| 4,325,600 | A | * | 4/1982 | Nestor | ......................... 439/523 |
| 4,675,780 | A | | 6/1987 | Barnes et al. | |
| 4,932,887 | A | * | 6/1990 | Kataoka et al. | ............. 439/198 |
| 5,934,937 | A | * | 8/1999 | McCarthy | .................... 439/583 |
| 6,095,838 | A | * | 8/2000 | Brickett | ...................... 439/201 |
| 6,202,743 | B1 | * | 3/2001 | Moore | ........................ 166/65.1 |
| 6,244,892 | B1 | * | 6/2001 | McCarthy | .................... 439/421 |
| 6,350,146 | B1 | * | 2/2002 | Su | ............................. 439/427 |

FOREIGN PATENT DOCUMENTS

| DE | 2 245 906 | 4/1974 |
|---|---|---|
| DE | 3 609 405 | 9/1987 |
| DE | 39 31 528 A1 | 4/1991 |
| DE | 44 09 797 | 12/1994 |
| DE | 198 08 645 A1 | 4/1999 |
| DE | 198 27 883 A1 | 1/2000 |

* cited by examiner

*Primary Examiner*—Hien Vu
(74) *Attorney, Agent, or Firm*—Hoffmann & Baron, LLP

(57) ABSTRACT

A connection member for flexible plastic fluid lines (11), whose wall contains at least electrical line strand (13). A female socket (15) for the plastic line (11) is connected with an inner fluid duct (28) in the connection member (10). The female socket (15) possesses a coupling means (22) for electrical connection with the at least one electrical line strand (13) in the plastic line (11). At least one connection cable (29) mounted to the side on the connection member (10) connects a sensor arrangement (30), which is arranged on an end of the cable remote from the connection member (10) electrically with the coupling means (22).

13 Claims, 3 Drawing Sheets

CONNECTOR PIECE FOR FLEXIBLE PLASTIC CONDUITS, COMPRISING A SENSOR ASSEMBLY

FIELD OF THE INVENTION

The invention relates to a connection member for flexible plastic fluid lines, whose wall contains at least one electrical line strand and/or light guide, a female socket for the plastic line and a sensor arrangement being provided.

BACKGROUND OF THE INVENTION

The European patent publication EP 0803653 discloses an arrangement, in the case of which the transmission of the working pressure and the sensor signals from position sensors of power cylinders takes place by way of electropneumatic plastic lines. In this case the electropneumatic plastic lines are connected by way of connection members with valve arrangements, which are arranged on the power cylinders. The positions sensors are connected by lines with the valve arrangements. The connection members are plugged into the valves and are held in place by holding screws. Owing to the electrical plug connections of the connection members leading to the valve arrangements screwing in of the connection members into conventional pneumatic female threaded openings is not possible. Moreover, the position sensors must be additionally and indirectly connected with the connection members, something which means a relatively large amount of fitting work.

SUMMARY OF THE INVENTION

One object of the present invention is to provide such a connection member, by way of which the pneumatic connection with the power cylinders and the electrical connection with corresponding position sensors may be simplified while only involving a small amount of assembly work.

There is the advantage that on the one hand the connection member may be screwed in a conventional manner into a pneumatic threaded opening in the power cylinder, the position sensor or sensors or other sensors only having to be mechanically secured in addition. Electrical connection no longer have to be separately produced. Furthermore, other sensors, as for instance pressure sensors, only have to be mechanically plugged in suitable sockets. The danger of wrong electrical connections and confusion of connections for the sensors is then out of the question. If sensors are for example to be replaced owing to a defect, it is then merely necessary to replace the connection member. In this case as well there is no danger of faulty electrical connections despite the very simple assembly.

It is an advantage to so place at least one contact spike on the floor of the non-radially symmetrical female socket, said spike being adapted to the cross section of the plastic line, to serve a coupling means, that on insertion of the plastic line into the female socket it is flush with the at least one electrical line strand and penetrates it. Accordingly by simple insertion of the plastic fluid line into the female socket the electrical connections may be automatically produced even if several line strands are present in the wall of the plastic line. An additional or the need for postponed production of the electrical connection is completely dispensed with. Since on insertion the plastic line into the female socket the contact spike are directly inserted into the line strands a reliable electrical connection is ensured, more particularly because the contact spikes slip into the line strands in the longitudinal direction and accordingly form a contact area which is longer than in the case of transverse insertion.

As an alternative or in addition the wall of the plastic line may also contain at least one light guide, in which case instead of the contact spikes there will be optical transmitters or optical transducers on the floor of the female socket. The advantages described will occur with this design as well.

Preferably the female socket possesses a piece of tube, which is parallel to the contact spike, slipping into the fluid duct on insertion of the plastic line or will consist essentially of such a tube. On slipping the plastic line onto the piece of tube there is on the one hand the formation of a sealing fluid connection and on the other hand such piece of tube will serve for centering and aligning the plastic line and accordingly renders possible reliable positioning position in relation to the contact spike or contact spikes.

For mechanically holding in position but also for an additional sealing effect it is advantageous to utilize clamping means which more particularly is designed in the form of a clamping screw means. The clamping screw means then advantageously comprises a screw thread around the female socket and furthermore a corresponding union nut, there being a wedge member, which can be moved axially along an oblique face by the union nut to serve for clamping the plastic line in position, and more especially for clamping between the piece of tube and the wedge member. On screwing in the union nut there is then not only the desired clamping action but additionally the plastic line is thrust into the female socket so that the electrical contact between the contact spikes and the line strands is improved owing to compacting the line cable material (contact pressure by way of the line cable material).

In accordance with an advantageous design the flexible wedge member is designed in the form of a clamping ring and possesses an inner shape matching the outline of the plastic line, the outer diameter tapering like a wedge toward the floor of the female socket. This means that owing to the clamping screw effect in conjunction with suitable sealing means there is at the same time a water-tight connection.

Consequently by way of an internal duct arrangement the female socket is connected with a further fluid connection point and/or a fluid actuator, the fluid connection point preferably being designed in the form of a fluid connection screw means for screwing into a fluid power device.

The sensor arrangement is preferably designed in the form of a position sensor for sensing the position of a piston. Particularly simple and reliable fitting and arrangement is made possible because the sensor arrangement and the electrical and/or optical connection cable are permanently connected together, and are more particularly molded on each other. Similarly the at least one connection cable is preferably permanently molded on the principal body of the connection member, since this means an arrangement which is sealed off form water and from the environment. It is naturally possible for the connection cable to be connected by way of a plugging or screwing connection with the connection member.

Preferred embodiments of the invention are represented in the drawings and will be explained in detail in the following account.

BRIEF DESCRIPTION OF THE DRAWINGS

FIG. 1 shows in longitudinal section a first working example as a connection member with a molded-on connection cable and a sensor, in the case of which a plastic fluid line having three electrical line strands in its wall is slipped on.

FIG. 2 is a cross sectional representation of the plastic fluid line.

DETAILED DESCRIPTION OF THE PREFERRED EMBODIMENT

Figures 1, 2:
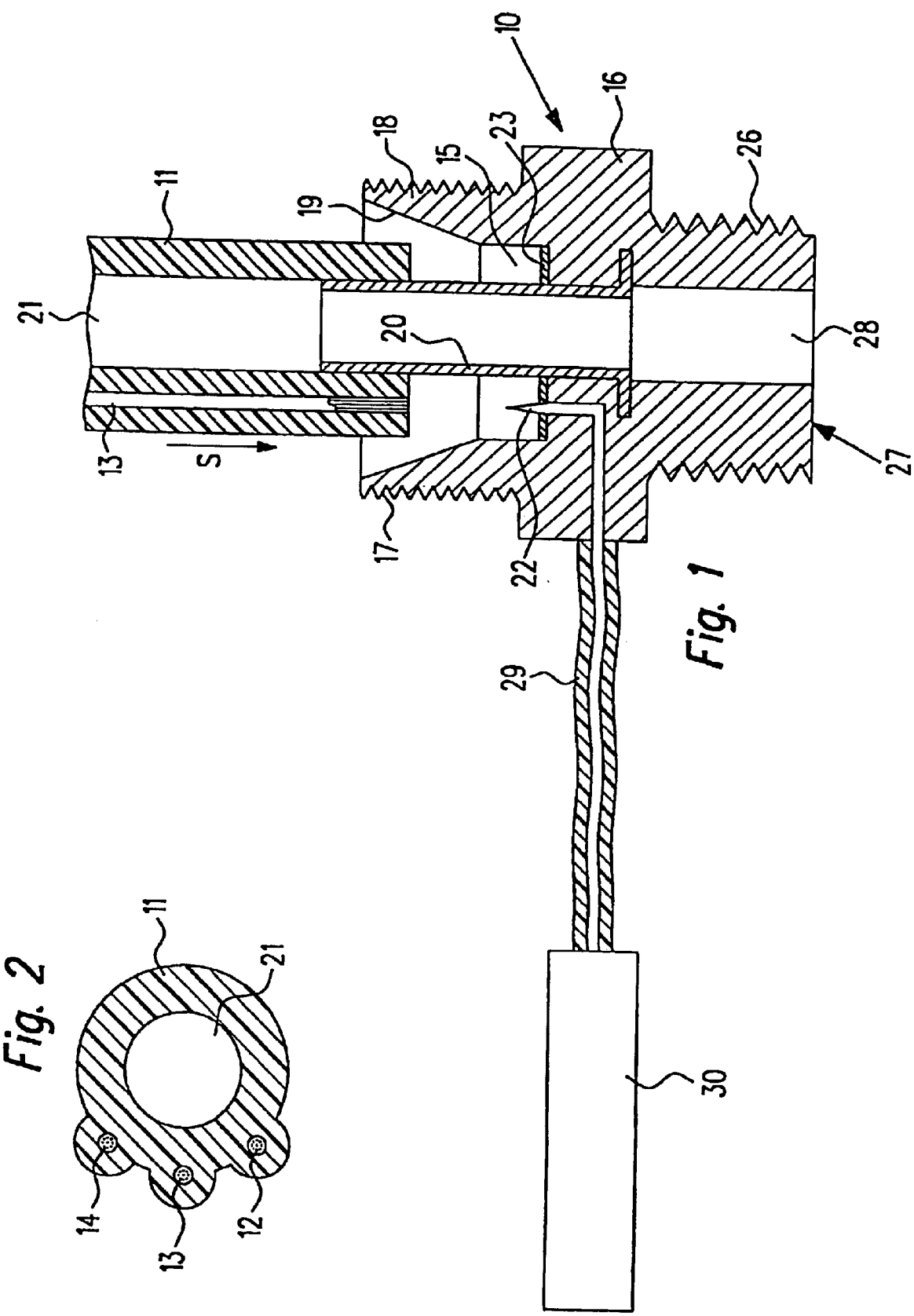
Figure 3:
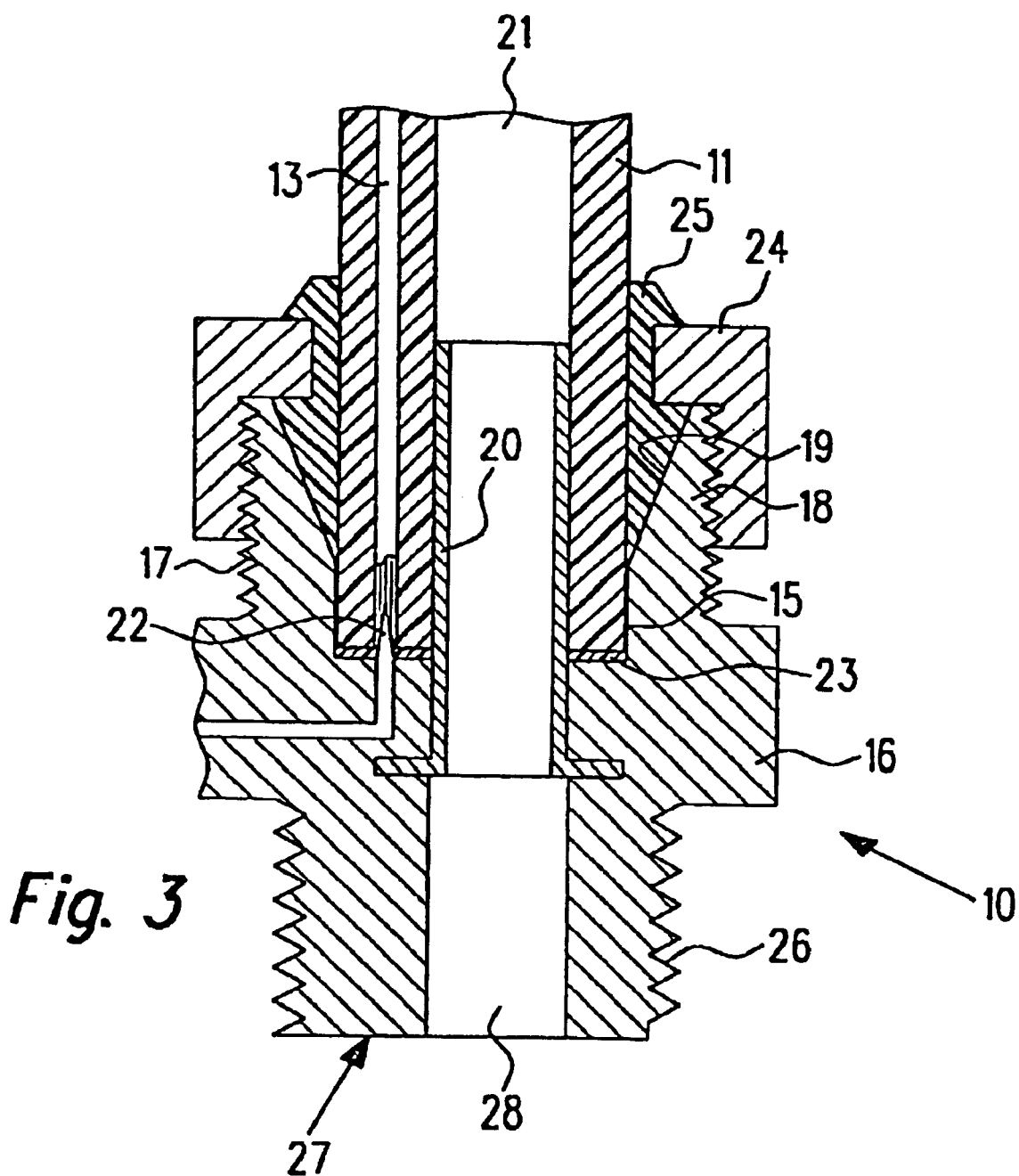
FIG. 3 shows the connection member in accordance with the first working embodiment with the plastic line fully inserted and held in place by clamping screw means.

The connection member 10 illustrated in FIGS. 1 and 3 as a first working embodiment essentially serves for connection with a flexible plastic fluid line 11, in whose wall three electrical line strands 12 through 14 extend, which for example are in the form of flexible cable. The number of the line strands 12 through 14 is naturally able to be selected as desired and may be between one and several line strands.

The plastic line 11 possesses a non-radially symmetrical cross section so that insertion into a female socket 15 with a corresponding cross section of the principal body 16 of the connection member 10 is only possible with a certain alignment. The female socket 15 is in this case surrounded by a tubular wall portion 18, externally bearing a screw thread 17, of the principal body 16. An adjoining part, next to the portion of the female socket 15, of the wall portion 18 is tapered toward its free axial end so that on its inner side a circularly conical oblique face 19 is formed. The female socket 15 is delimited radially inward by a piece 20 of tube which is anchored or molded in a sealing manner on or in the principal body 16 such piece 20 of tube extending past the free end of the wall portion 18. The outer diameter of the piece 20 of tube is in this respect slightly larger than the inner diameter of a fluid duct 21 in the interior of the plastic line 11.

Electrical contact spikes 22 extend from the floor of the female socket 15 in parallelism to the piece 20 of tube into the female socket 15, the number and arrangement of the contact spikes 22 matching the number and arrangement of the line strands 12 through 14 in the plastic line 11 so that on insertion of the plastic line 11 into the female socket 15, the contact spikes 22 penetrate into the line strands 12 through 14 and produce an electrically conductive connection, as is represented in figure 3. Owing to the cross sectional representation only the contact spike 22 will be seen which contacts the middle line strand 13. In this case there is furthermore a washer 23 between the floor of the female socket 15 and the end of the plastic line 11.

For securing the inserted plastic line 11 in the female socket 15 use is made of a union nut 24 adapted to be screwed onto the thread 17, such nut being able to be moved axially by a flexible elastic clamping ring 25 resembling a tongs or collet. The inner shape of the clamping ring 25 matches the outline of the plastic line 11, whereas the outline of the clamping ring 25 is designed with a complementary circularly conical form at least adjacent to the circularly conical oblique face 19 of the wall portion 18 so that on screwing in the union nut 24 the clamping ring 25 is thrust by the wedging action against plastic line 11 and clamps same against the piece 20 of tube. When this happens on screwing in the union nut 24 using clamping ring 25 a force is exerted on the plastic line 11 in the direction S of insertion by which the plastic line 11 is thrust against the floor of the female socket 15 and accordingly against the sealing washer 23. Simultaneously the contact spikes are forced even farther into the plastic line 11 and, respectively, the line strands 12 through 14 if they have not so far already fully penetrated during insertion. In addition the compaction of the elastic material of the line cable means that the contact pressure will be increased.

As a modification of the working example illustrated instead of the clamping screw means illustrated other known clamping or detent connection means or furthermore other inner screw means may be employed. In the simplest case it is for example possible for only the piece 20 of tube to be provided on its outer face, and/or for the wall portion 18 to be provided on its inner side, with annular holding projections for securing the inserted plastic line 11 in place. Such holding projections may also additionally be employed in the working example described. Furthermore the contact spikes 22 may be differently arranged or be replaced by other contact means.

The end portion, axially opposite to the wall portion 18, of the principal body 16 is designed in the form of as a screw means for screwing into a fluid power device, such as a valve, a power cylinder or the like. For this purpose the tubular screwing portion 27 is provided with an outer thread 26, an inner duct 28 extending from the end as far as the piece 20 of tube to produce the fluid connection.

In accordance with FIG. 1 an electrical cable 29 is mounted or molded on the principal body 16, which produces an electrical connection between a sensor arrangement 30 and the contact spikes 22. If the sensor arrangement 30 only requires two lines for signal transmission it is then possible for the cable 29 to be made with two instead of three cores so that one of the contact spikes 22 is not connected or is omitted. The electrical cable 29 may in this case be molded both on the sensor arrangement 30 and also on the principal body 16 in a sealing manner. Such a sensor arrangement serves for example for sensing position, for sensing pressure, or for sensing temperature. In this case the sensor arrangement 30 comprises known sensors for the respective sensing action, hail elements being for instance employed for position sensing or other sensors responsive to magnetic and/or electrical fields may be employed.

A suitable design is one for example in which two connection members 10 are screwed into two pressure connections of a power cylinder in order to perform the two oppositely directed working movements. In this case the molded sensor arrangements 30 serve for detecting the position of the piston of the power cylinder and they are suitably mounted on the housing of the power cylinder or adjusted in position thereon. In this case the connection members may also comprise a plurality of sensors, as for example a plurality of position sensors and/or pressure sensors.

Instead of a molded electrical cable 29 the connection point may also be in the form of a plug-in or screw connection. Furthermore in an alternative design several electrical cables 29 may be mounted, molded or connected using several plug-in or screw connections, on the principal body 16 in order for example to connect a plurality of sensor arrangements or other devices with the line strands 12 through 14 in the plastic line 11.

Figure 4:
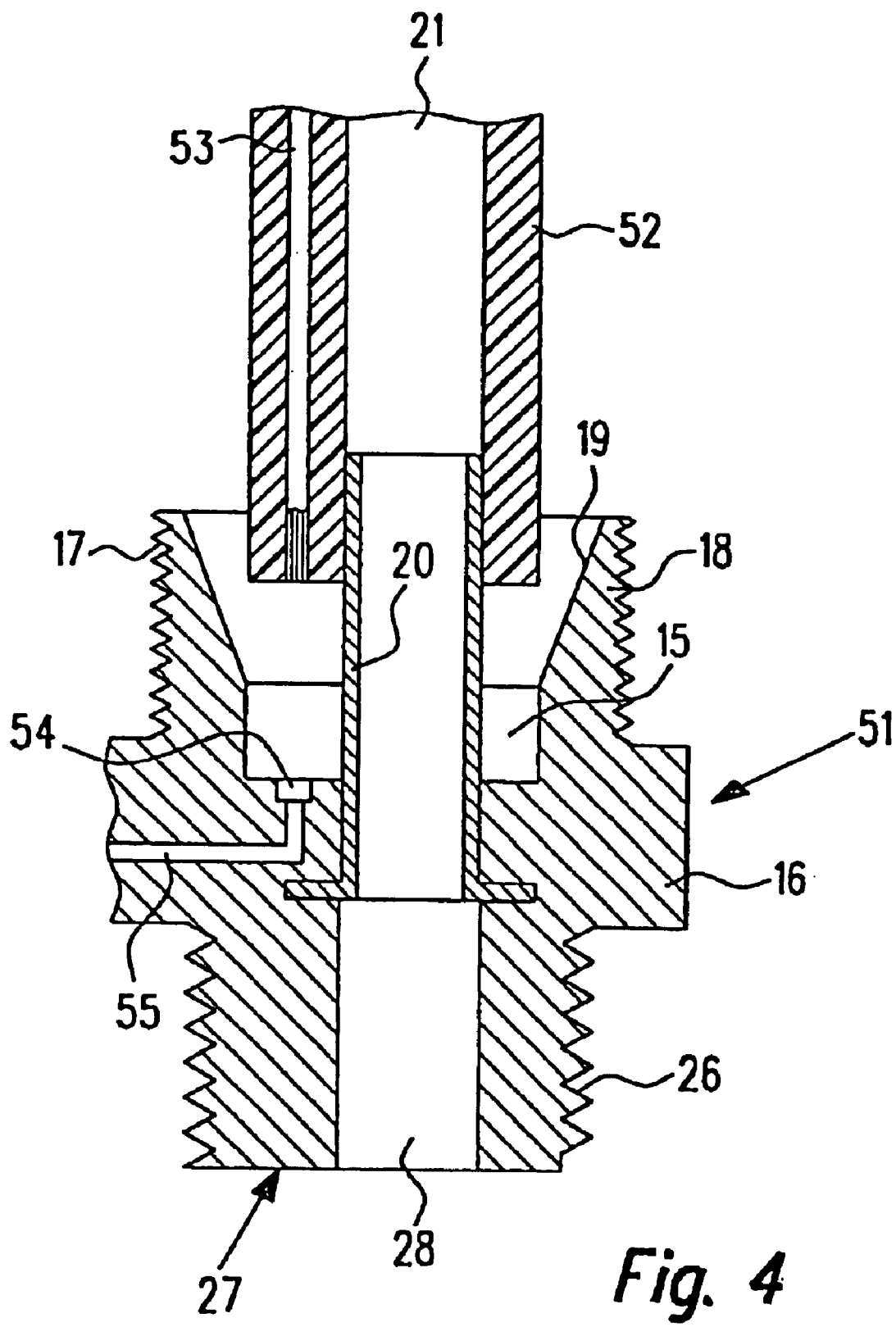
FIG. 4 shows a second working embodiment of a connection member for optical signal transmission, in longitudinal section.

An alternative embodiment of the present invention is illustrated in FIG. 4 in the form of a connection member 51 and is generally the same as the preferred embodiment in the form of the connection member 10, similar or functionally equivalent components being denoted with the same reference numerals and not being described over again. Differing from the first working example in this case there is a plastic line 52 with a suitable cross section, in whose wall instead of electrical line strands 12 through 14 light guides 53 are arranged. On the floor of the female socket 15 the contact spikes 22 are replaced by optical transmitters 54, which when the plastic line 52 in inserted make an optical connection with the ends of the light guides 53. The electrical lines connected with the contact spikes 22 and extending internally in the principal body 16 are in this case replaced by internal light guides 55 arranged in a similar manner. The manner of operation of the second working example depicted in FIG. 4 is basically the same as that of the first working example, in which respect however the only difference being that the electrical signal transmission is replaced by optical signal transmission.

As a modification of this alternative embodiment, in a simpler design, the optical transmitters 54 would be omitted so that the light guides 53 in the plastic line 52 would be in optical contact with the internal light guides 55. Alternatively optical transmitters 54 could be replaced by optical transducers so that here optical signals would be converted into optical signals and the internal light guides 55 would again be replaced by electrical lines.

In principle hybrid designs are possible including features of the first and the second embodiments, that is to say a plastic line would in part comprise electrical line strands and in part light guides, suitable contact spike and optical transmitters or, respectively, optical transducers then being arranged in the female socket 15. For instance one light guide could be provided for signal transmission and two electrical line strands could be provided for electrical amplifiers and, respectively, for power supply.

What is claimed is:

1. A connection member for a flexible plastic fluid line having a peripheral wall defining an inner fluid conduit and at least one electrical line strand and/or light guide disposed in the peripheral wall thereof, the connection member, comprising a female socket for receiving the plastic line, an inner fluid duct in fluid communication with the female socket for communicating with the inner fluid conduit of the plastic line, a coupling means axially spaced from the inner fluid duct for the electrical and/or optical connection with the at least one electrical line strand and/or the light guide, and at least one connection cable mounted to the side on the connection member, the connection cable having a sensor arrangement arranged at an end thereof, and connected electrically and/or optically with the coupling means, wherein the female socket includes a floor and is adapted to the cross-section of the plastic line and the coupling means is arranged in the floor of the female socket that on insertion of the plastic line into the female socket, the coupling means engages with the at least one electrical line strand and/or the light guide.

2. The connection member as set forth in claim 1, wherein the coupling means comprises at least one electrical contact spike which penetrates into an electrical line strand disposed in the wall of the plastic line.

3. The connection member as set forth in claim 1, wherein the coupling means comprises at least one optical transmitter or optical transducer which is flush with a light guide disposed in the wall of the plastic line and produces an optical connection.

4. The connection member as set forth in claim 1, wherein the female socket includes a piece of tube, such piece of tube being aligned in a direction for plugging into the plastic line.

5. The connection member as set forth in claim 1, further comprising a clamping means holding a plastic line inserted into the female socket, such clamping means being in the form of a clamping screw means.

6. The connection member as set forth in claim 5, further comprising a wall portion fitting around the female socket in an annular manner and having a thread and furthermore comprising a corresponding screwing element, and a wedge member moved by the screwing element axially along an oblique or circularly conical face being provided for clamping the plastic line.

7. The connection member as set forth in claim 6, wherein the wedge member is designed in the form of a clamping ring and possesses an internal shape corresponding to the outline of the plastic line, the outer diameter of the wedge member tapering like a wedge or a circular cone toward a floor of the female socket.

8. The connection member as set forth in claim 1, further comprising a fluid connector adjacent the inner fluid duct for connection with a fluid power device.

9. The connection member as set forth in claim 8, wherein the fluid connector is designed in the form of a connection screw means for screwing into the fluid power device.

10. The connection member as set forth in claim 1, wherein the sensor arrangement is designed in the form of a position sensor.

11. The connection member as set forth in claim 1, wherein the sensor arrangement and the connection cable are integrally molded together.

12. The connection member as set forth in claim 1, wherein the at least one connection cable is permanently molded on the side of the connection member.

13. The connection member as set forth in claim 1, wherein the at least one connection cable is connected to the side of the connection member by way of a plug-in or screw connection.

* * * * *

UNITED STATES PATENT AND TRADEMARK OFFICE
CERTIFICATE OF CORRECTION

PATENT NO. : 6,848,924 B2
DATED : February 1, 2005
INVENTOR(S) : Herbert Frisch

It is certified that error appears in the above-identified patent and that said Letters Patent is hereby corrected as shown below:

Column 4,
Line 41, now reads, "action, hail" should read -- action, hall --

Column 5,
Line 49, now reads, "socket that" should read -- socket so that --

Signed and Sealed this

Twenty-eighth Day of June, 2005

JON W. DUDAS
*Director of the United States Patent and Trademark Office*